(12) United States Patent
Tirelli et al.

(10) Patent No.: US 8,352,402 B2
(45) Date of Patent: Jan. 8, 2013

(54) MULTIPLE ENTRY POINT NETWORK FOR STREAM SUPPORT IN A RULE ENGINE

(75) Inventors: Edson Tirelli, Montreal (CA); Mark Proctor, London (GB)

(73) Assignee: Red Hat, Inc., Raleigh, NC (US)

( * ) Notice: Subject to any disclaimer, the term of this patent is extended or adjusted under 35 U.S.C. 154(b) by 724 days.

(21) Appl. No.: 12/540,275

(22) Filed: Aug. 12, 2009

(65) Prior Publication Data

US 2011/0040708 A1    Feb. 17, 2011

(51) Int. Cl.
*G06F 17/00* (2006.01)
*G06N 5/02* (2006.01)
(52) U.S. Cl. ........................................ 706/47
(58) Field of Classification Search ............... 706/12, 706/47
See application file for complete search history.

(56) References Cited

U.S. PATENT DOCUMENTS

2003/0229605 A1* 12/2003 Herrera et al. .................. 706/47

OTHER PUBLICATIONS

Sohn, A and J-L Gaudiot. "Performance Evaluation of the Multiple root node approach to the Rete pattern matcher for production systems" Dec. 1991 [online] Downloaded May 7, 2012 http://www.osti.gov/energycitations/servlets/purl/10192686-qADuhQ/native/.*

Forgy, Charles. RETE: A fast algorithm for the many pettern/many object pattern match problem. Artificial intelligence, vol. 19, Issue 1, Sep. 1982. ages 17-37. [online] Downloaded 57/7/2012. https://cit-server.cit.tu-berlin.de/~battre/db.rdf.forgy.90.rete.pdf.*
"Drools Fusion User Guide", accessed at: http://downloads.jboss.com/drools/docs/5.0.1.26597.FINAL/drools-fusion/html_single/index.html on Jun. 12, 2009, 37 pages.
Tirelli, E., "Extending Rete for Complex Event Processing", PowerPoint presentation, Oct. 2008, 45 pages.
Proctor, M., "Drools Business Logic Integration/Platform: Guvnor, Expert, Fusion, Flow", PowerPoint presentation, Oct. 2008, 69 pages.
"Drools Expert", accessed at: http://www.jboss.org/drools/drools-expert.html on Jun. 12, 2009, 4 pages.
"Drools Fusion", accessed at http://www.jboss.org/drools/drools-fusion.html on Jun. 12, 2009, 3 pages.
"Drools Flow", accessed at: http://www.jboss.org/drools/drools-flow.html on Jun. 12, 2009, 6 pages.

* cited by examiner

*Primary Examiner* — Ben Rifkin
(74) *Attorney, Agent, or Firm* — Lowenstein Sandler PC (57) ABSTRACT

Some embodiments of a multiple entry point network for stream support in an exemplary rule engine have been presented. In one embodiment, a stream of events is asserted into a working memory of a rule engine, which supports event processing. The rule engine, running on a server, processes the stream of events against a set of rules retrieved from a rule repository of the rule engine. To process the events, the rule engine may construct a network having multiple root nodes, each being an entry point into the network, through which the events may enter the network and propagate through the network.

17 Claims, 7 Drawing Sheets

FIG. 7

MULTIPLE ENTRY POINT NETWORK FOR STREAM SUPPORT IN A RULE ENGINE

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine is a set of one or more software modules running on a computing device (e.g., a server, a personal computer, etc.) that processes information by applying rules to data objects (also known as facts). A rule is a logical construct for describing the operations, definitions, conditions, and/or constraints that apply to some predetermined data to achieve a goal. Various types of rule engines have been developed to evaluate and process rules. Conventionally, a rule engine creates a rulebase containing a network to process rules and data objects, such as the example shown in FIG. 1. The network may include many different types of nodes, including, for example, object-type nodes, alpha nodes, left-input-adapter nodes, eval nodes, join nodes, not nodes, and terminal nodes, etc. But the conventional network has only one root node 101.

Figure 1:
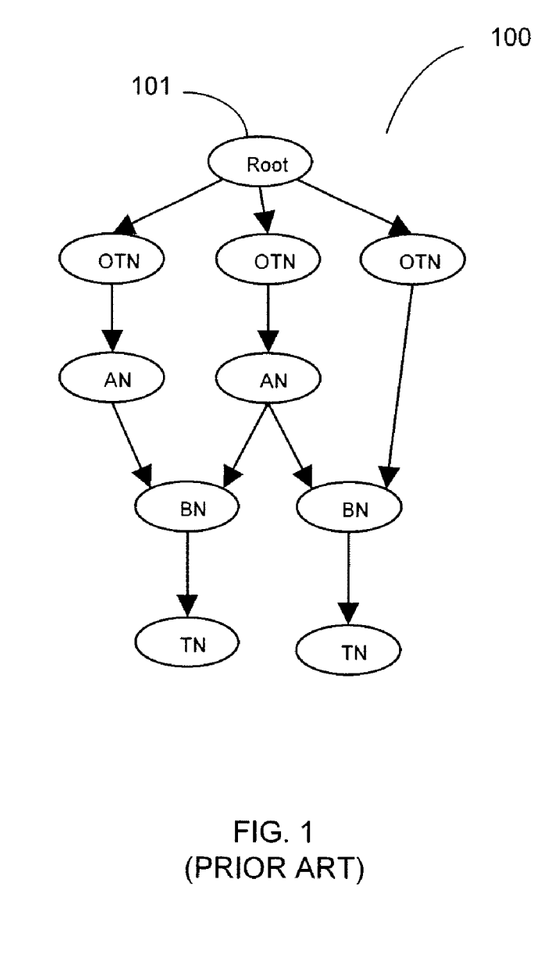
FIG. 1 illustrates a conventional Rete network.

Typically, facts enter a network at the root node 101, from which they are propagated to any matching object-type nodes. From a object-type node, a data object is propagated to either an alpha node (if there is a literal constraint), a left-input-adapter node (if the data object is the left most object type for the rule), or a beta node (such as a join node).

Note that traditional applications using rule engines work by gathering all the facts regarding a given problem or scenario, inserting them into the working memory, executing the rules, obtaining the results, and starting the processing of the next work item. However, as more and more applications in today's business world demand the capability of event processing, where events represent state changes, typically have temporal relationship between them, and are generated in continuous streams, the conventional rule engines discussed above are inadequate to meet the demands of these applications.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a multiple entry point network for stream support in a rule engine. In one embodiment, a stream of events is asserted into a working memory of a rule engine, which supports event processing. The rule engine, running on a server, processes the stream of events against a set of rules retrieved from a rule repository of the rule engine. To process the events, the rule engine may construct a rulebase that contains a network having multiple root nodes, each being an entry point of the network. Through the root nodes, the events may enter the network and propagate through the network. Because the rule engine according to some embodiments of the invention processes rules and events in the same rulebase, the rulebase is hereinafter referred to as a "knowledge base" instead to distinguish it from rulebases created by conventional rule engines. Likewise, a rule session of the rule engine according to some embodiments of the invention is referred to as a knowledge session hereinafter. More details of some embodiments of the rule engine are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 2:
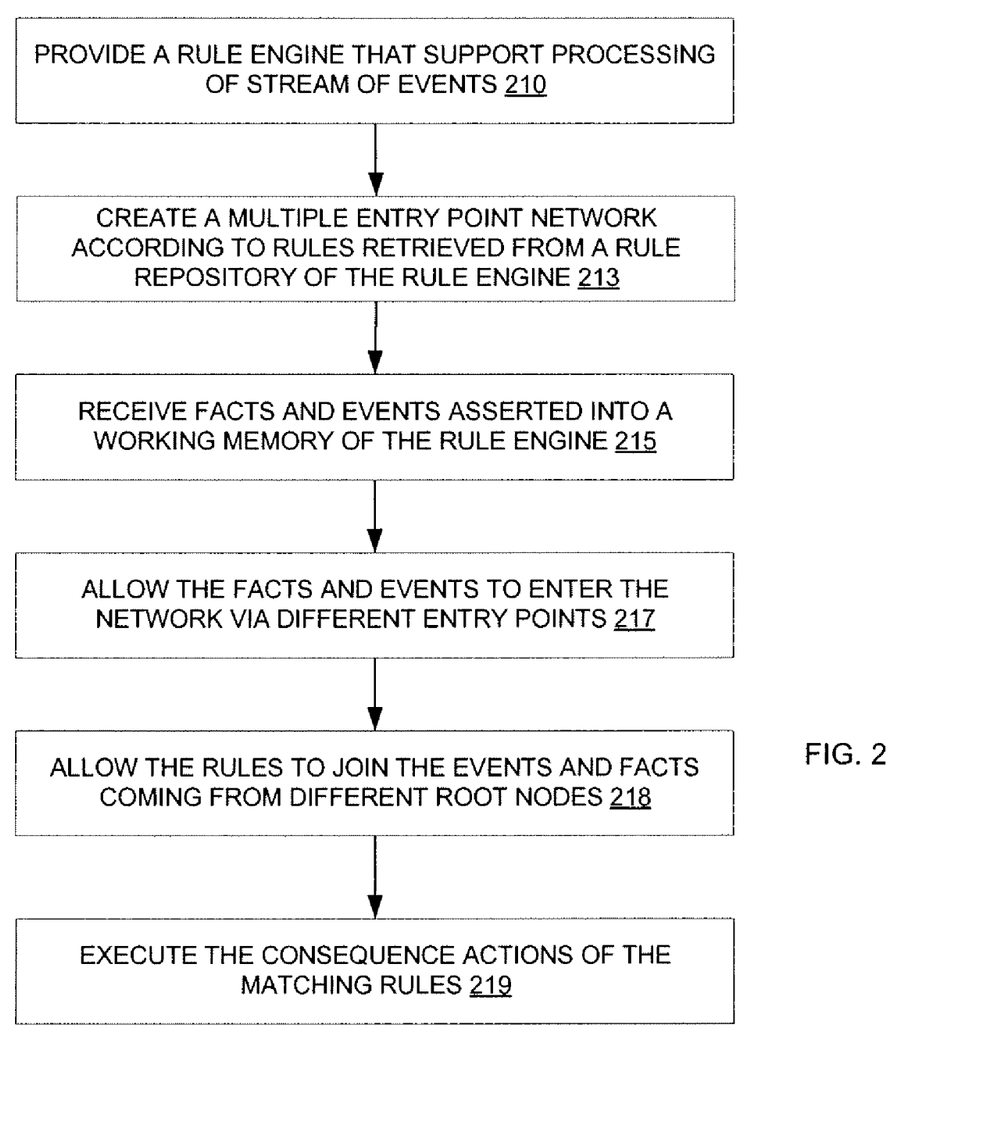
FIG. 2 illustrates one embodiment of a method to process a stream of events using a rule engine.

FIG. 2 illustrates one embodiment of a method to process stream of events using a rule engine. The process may be performed by processing logic that may comprise hardware (e.g., circuitry, dedicated logic, programmable logic, microcode, etc.), software (such as instructions run on a processing device), firmware, or a combination thereof. For example, the rule engine 430 in FIG. 4 may perform at least part of the process in some embodiments.

Referring to FIG. 2, processing logic provides a rule engine that supports processing of streams of events (processing block 210). Generally speaking, a rule engine is a set of one or more processing modules, which receives facts asserted by users and rules, evaluate the facts against the rules, and may perform certain actions (or cause certain actions to be performed) based on the result of the evaluation. One embodiment of a rule engine according to the present invention is shown in details in FIG. 4. Facts as used herein broadly refer to data. Generally speaking, a rule is a logical construct for describing the operations, definitions, conditions, and/or constraints that apply to some predetermined data to achieve a goal. For example, a business rule might state that no credit check is to be performed on return customers. As previously mentioned, conventional rule engines do not support streams processing. In contrast, some embodiments of the rule engine that support processing of streams of events as described herein may receive events asserted into the working memory in addition to facts.

An event as used herein broadly refers to a record of a significant change of state in an application domain. For instance, for one exemplary stock broker application, when a sell operation is executed, it causes a change of state in the domain. This change of state can be observed on several entities in the domain, like the price of the securities that has changed to match the value of the operation, the owner of the individual traded assets that change from the seller to the buyer, the balance of the accounts from both seller and buyer that are credited and debited, etc. Depending on how the domain is modelled, this change of state may be represented by a single event, multiple atomic events, or even hierarchies of correlated events. In some embodiments, an event may be viewed as a special type of facts by the rule engine. Thus, facts supported by conventional rule engines may be referred to as regular facts hereinafter. A stream of events generally refers to a series of at least two events occurring at different times.

Figure 3A:
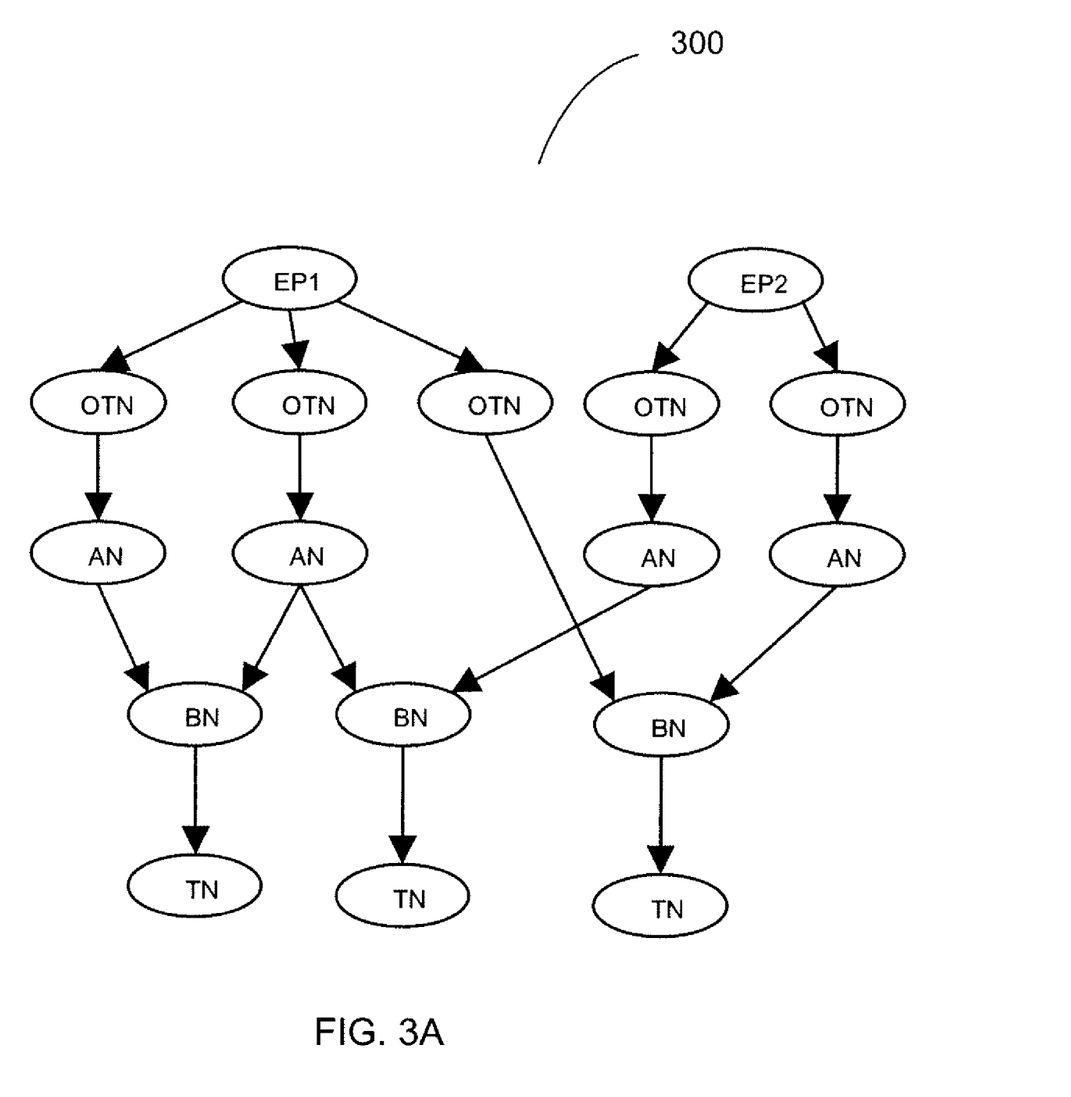
FIG. 3A shows one embodiment of a multiple entry point network.

To prepare for processing streams of events, processing logic creates a network having multiple root nodes, each of the root nodes being an entry point of the network, according to rules retrieved from a rule repository of the rule engine (processing block 213). One exemplary embodiment of the network is shown in FIG. 3A. Details of some embodiments of a method to construct a network having multiple root nodes according to rules are discussed below with reference to FIG. 3B. In some embodiments, the concept of a stream is generalized as an entry point, which is a gate through which regular facts and events come from. Facts and/or events from one entry point may join with facts and/or events from any other entry point. Although they may never mix, that is, they may never lose the reference to the entry point through which they entered. This is important because one may have the same type of facts coming into the network through several entry points, but one fact that is inserted through entry point A will never match a pattern from another entry point, say, for example, entry point B.

To process the events and regular facts, processing logic may perform the following operations. In some embodiments, processing logic receives regular facts and events asserted into the working memory of the rule engine (processing block 215). Then processing logic allows the regular facts and events to enter the network via different entry points (i.e., the root nodes) of the network according to the rules (processing block 217). In some embodiments, entry points are declared implicitly by directly making use of the entry points in the rules. For example, referencing an entry point in a rule may make the rule engine, at compile time, to identify and create the proper internal structures to support that entry point. For example, consider one exemplary banking application, where transactions are fed into the system coming from streams. One of the streams contains all the transactions executed in automatic teller machines (ATMs). So, if one of the rules says: a withdrawal is authorized if and only if the account balance is over the requested withdraw amount, the rule may be written as follows:

```
rule "authorize withdraw"
when
    WithdrawRequest( $ai : accountId, $am : amount) from entry-point "ATM Stream"
    CheckingAccount( accountId == $ai, balance > $am )
then
    // authroize withdraw
end
```

In the above example, the rule engine compiler may identify that the first pattern is tied to the entry point "ATM Stream" and may both create all the necessary structures for the knowledge base to support the "ATM Stream" and may only match WithdrawRequests coming from the "ATM Stream."

Processing logic may further allow the rules to join regular facts and events coming from different root nodes of the network (processing block 218). For instance, referring back to the exemplary banking application discussed above, the rule set forth above is also joining the event from the stream with a fact from the main working memory (CheckingAccount). Finally, processing logic executes the consequence actions of the matching rules (processing block 219). To further illustrate the above approach, another example is discussed in details below.

In another example, consider a second rule that states that a fee of $2 must be applied to any account for which a withdraw request is placed at a bank branch. The second rule may be written as follows:

```
rule "apply fee on withdrawals at branches"
when
```

-continued

```
    WithdrawRequest ( $ai :accountId, processed == true ) from
entry-point "Branch Stream"
        CheckingAccount ( accountId == $ai )
    then
        // apply a $2 fee on the account
    end
```

The above rule may match events of the exact same type as the first rule (WithdrawRequest), but from two different streams, so an event inserted into "ATM Stream" may not be evaluated against the pattern on the second rule because the rule states that it is only interested in patterns coming from "Branch Stream." So, entry points, besides being a proper abstraction for streams, may also be a way to scope facts in the working memory.

In some embodiments, events may be inserted into an entry point, instead of inserting the events directly into the working memory. One example is shown below to illustrate the technique:

```
    // create a knowledge base and a knowledge session as usual
    StatefulKnowledgeSession session = ...
    // get a reference to the entry point
    WorkingMemoryEntryPoint atmStream =
    session.getWorkingMemoryEntryPoint( "ATM Stream" );
    // and start inserting facts into the entry point
    atmStream.insert( aWithdrawRequest );
```

The above example shows how to manually insert facts into a given entry point. Although, usually, the application uses one of the many adapters to plug a stream end point, such as a Java Message Service (JMS) queue, directly into the engine entry point, without coding the inserts manually. The rule engine pipeline application programming interface (API) may have several adapters and helpers to do that.

To support stream processing, the classic network (e.g., Rete network 100 in FIG. 1) built by rule engines are adapted in some embodiments. Specifically, a network including a directed graph with multiple leaves and multiple root nodes is built, which may also be referred to as a multiple entry point network or a multiple root node network. One embodiment of such a network is shown in FIG. 3A. Before going further into the discussion of the multiple entry point network, the definitions of the mnemonics used herein are first explained.

In some embodiments, a root as used herein refers to the root node for the classic Rete algorithm. An object type node (OTN) refers to the first level in the Rete network. An alpha network (AN) refers to a sequence of nodes responsible for evaluating alpha constraints. In FIG. 3A, ANs are represented as a single node for simplicity, but there can be zero to many nodes in the AN, following each of the OTNs. A Beta Network (BN) is a sequence of nodes responsible for joining branches in the network and applying the beta constraints. In FIG. 3A, BNs are represented as single nodes for simplicity, but there can be zero to many BNs preceding each Terminal Node. A Terminal Node (TN) is a node for one of the rules in the knowledge base. There is one TN for each rule. Entry Point n (EPn) refers to a root node named "n" in the adapted network. In FIG. 3A, the name is a numerical sequence for simplicity. In some embodiments, the first entry point (which is implicit) is called "EntryPoint:MAIN" and each subsequent entry point receives a name explicitly defined by rule engine users.

Referring to FIG. 3A, each entry point has its own set of OTNs and AN. Neither OTNs nor AN are shared between different entry points. They are completely independent and do not interface with each other in any way. The BN nodes, on the other hand, may receive inputs from nodes coming from the same entry point or from different entry points. This is one important characteristic in some embodiments to allow rules to join facts and events coming from different entry points.

One example of a rule joining events from multiple entry points could be an expert system used by an airline to determine if an airplane is ready to depart. One rule regarding departure may be: if there is a customer that confirmed the check-in and dispatched a bag, and the bag is not loaded into the plane yet, do not release the plane. That rule may be written as follows:

```
rule "missing bag"
when
    Customer( $id : id)
    BagDispatchedEvent( customerId == $id, $bagId : bagId ) from
entry-point "checkin stream"
    Not( BagLoadedEvent( bagId == $bagId ) from entry-point "cargo
loader stream" )
then
    // plane is not ready yet
end
```

In the above example, the pattern Customer has no explicit entry point associated with it, so the rule engine may automatically look for it in EntryPoint:MAIN. The BagDispatchedEvent is expected in EntryPoint: "checkin stream." The BagLoadedEvent is expected to come from EntryPoint: "cargo loader stream." As it can be seen in the above example, the use of streams is made explicit by the use of the "from entry-point" keywords, but other than that, is transparent to rule authors.

Figure 3B:
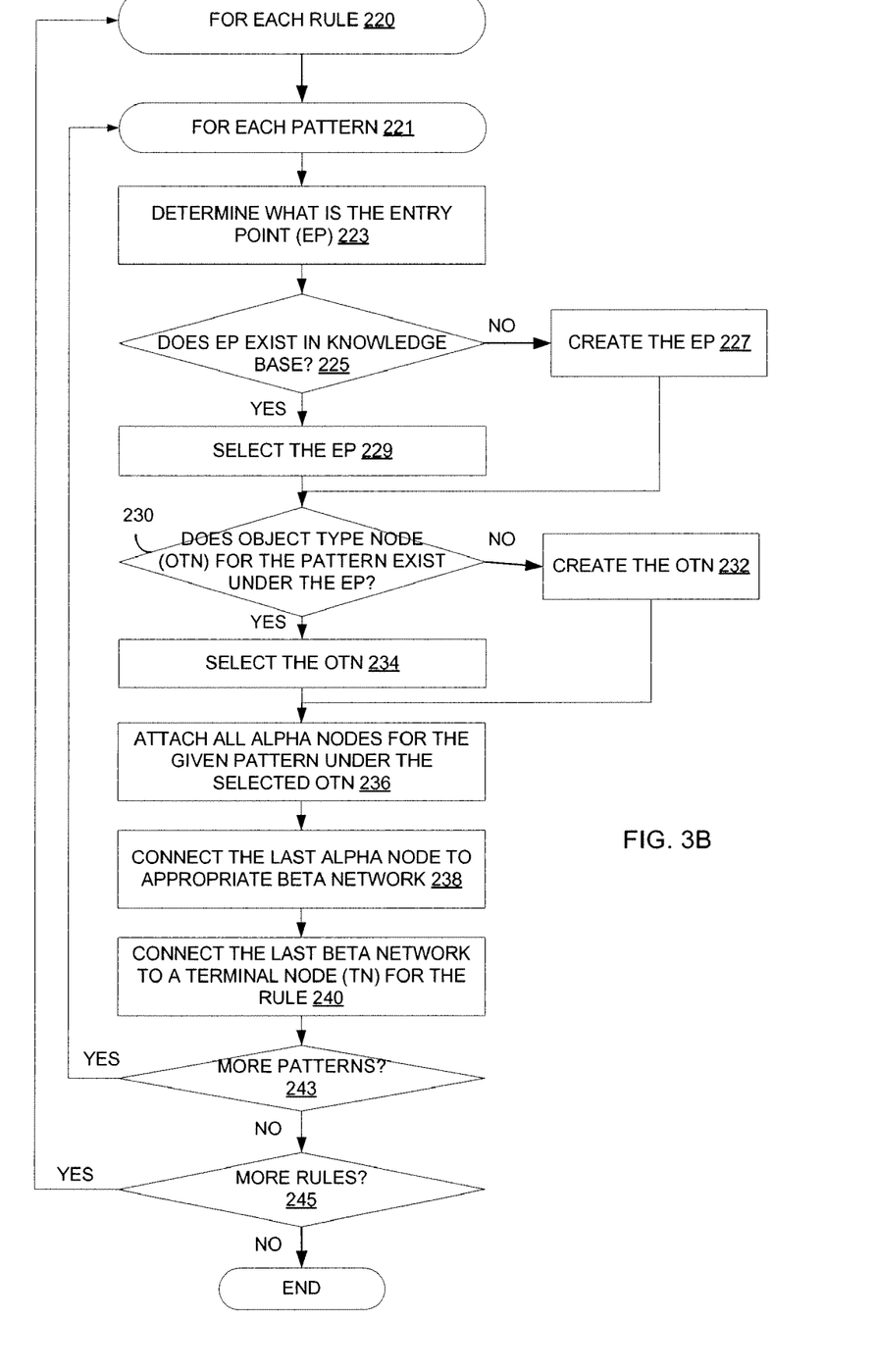
FIG. 3B illustrates one embodiment of a process to construct a multiple entry point network for a rule engine.

FIG. 3B illustrates one embodiment of a process to construct a multiple entry point network for a rule engine. The process may be performed by processing logic that may comprise hardware (e.g., circuitry, dedicated logic, programmable logic, microcode, etc.), software (such as instructions run on a processing device), firmware, or a combination thereof. For example, the rule engine 430 in FIG. 4 may perform at least part of the process in some embodiments.

As previously discussed, the multiple entry point network is constructed according to a set of rules retrieved from a rule repository of the rule engine. For each rule, processing logic enters processing block 220. Each rule may have one or more patterns. For each pattern of a given rule, processing block enters processing block 221. The following operations are then performed for each pattern.

First, processing logic determines what the entry point is for a given pattern of a given rule (processing block 223). Then processing logic determines if the entry point already exists in the knowledge base (processing block 225). If the entry point already exists in the knowledge base, then processing logic selects the entry point (processing block 229). Otherwise, processing logic creates the entry point (processing block 227).

Next, processing logic determines if an OTN for the pattern exists under the entry point (processing block 230). If the OTN for the pattern exists under the entry point, then processing logic selects the OTN (processing block 234). Otherwise, processing logic creates the OTN (processing block 232).

In some embodiments, processing logic attaches all ANs for the given pattern under the OTN (processing block 236). Then processing logic connects each AN to the appropriate BN (processing block 238). Note that streams of events usually include events that are concurrent and asynchronous. This means all the streams connected to a given knowledge base usually push events into the knowledge base without any type of synchronization with other streams. The classic Rete algorithm requires that only one propagation should be processed through the conventional rule base in any given moment as a way to maintain the reasoning process integrity. In order to maintain integrity and still enable proper support to multiple unsynchronized streams pushing data concurrently into the knowledge base, processing logic may analyze whether the alpha and the beta network being connected are chained to the same entry point or to different entry points in some embodiments. In case they are chained to the same entry point, a regular connection is made. In case they are chained to different entry points, processing logic may create a special node called PropagationQueuingNode (PQN) and connects the AN into this node and this node into the BN. The goal of this node, as its name indicates, is to queue propagations until it is safe to propagate events into the BN without compromising the reasoning integrity. In some embodiments, the knowledge base runtime algorithm employs a round robin timeshare based algorithm to properly manage the distributed propagation from the PQN.

Finally, processing logic connects the last BN to a TN for the given rule (processing block 240). After performing the above operations for the given pattern, processing logic checks if there are any more patterns for the given rule (processing block 243). If there is, then processing logic returns to processing block 221 to repeat the above operations. Otherwise, processing logic checks if there are any more rules (processing block 245). If there is, then processing logic returns to processing block 220 to repeat the above operations. Otherwise, the process ends.

Figure 4:
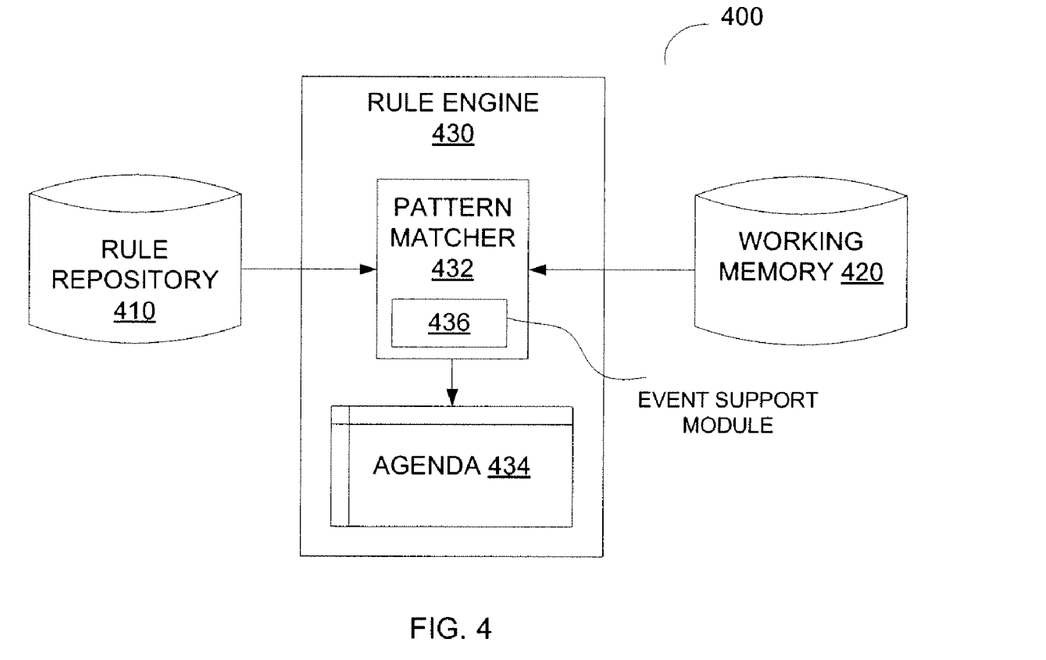
FIG. 4 shows one embodiment of a rule engine usable with some embodiments of the present invention.

FIG. 4 shows one embodiment of a rule engine that supports multiple entry point network for event stream processing. In some embodiments, a rule engine 430 is operatively coupled to a rule repository 410 and a working memory 420. The rule repository 410 stores a rule set having a number of rules. The rule repository 410 may also be referred to as a production memory. The working memory 420 stores regular facts and events that have been asserted.

In some embodiments, the rule engine 430 includes a pattern matcher 432 and an agenda 434. The pattern matcher 432 may evaluate the rules from the rule repository 410 against the regular facts and events from the working memory 420. Specifically, an event support module 436 within the pattern matcher 432 generates a multiple entry point network, through which the regular facts and events asserted may propagate through and match the appropriate rules. As the regular facts and events propagating through the network, the pattern matcher 432 evaluates the regular facts and events against the rules. Details of some examples of how to generate a multiple entry point network and how to use such a network to evaluate rules against events have been described above.

Fully matched rules result in activations, which are placed into the agenda 434. The rule engine 430 may iterate through the agenda 434 to execute or fire the activations sequentially. Alternatively, the rule engine 430 may execute or fire the activations in the agenda 434 randomly.

Figure 5:
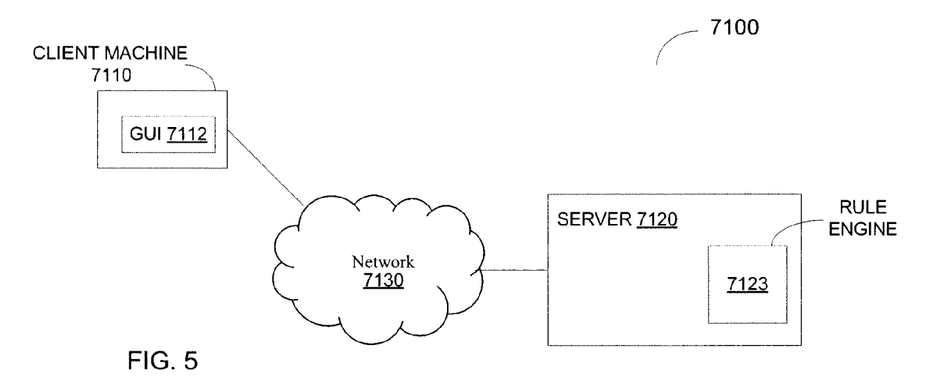
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 having the architecture as illustrated in FIG. 4. The client machine 7110 may present a GUI 7112 (e.g., a webpage rendered by a browser) to allow users to input rule sets, events, and/or facts, which may be sent to the server 7120 to be processed using the rule engine 7123 as discussed above.

Figure 6:
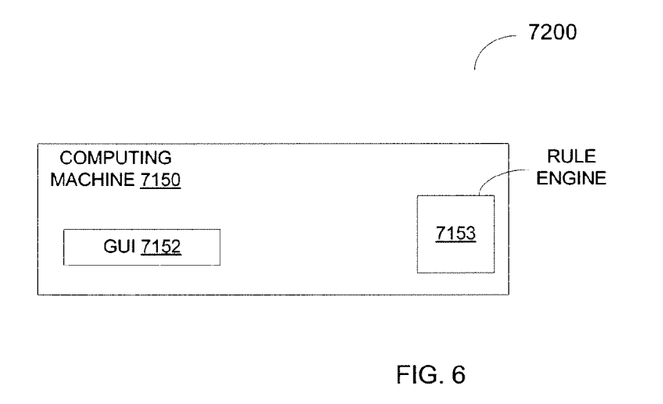
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a rule engine 7153 and a GUI 7152. Some embodiments of the rule engine 7153 have been discussed above with reference to FIG. 4. In some embodiments, users may input files for rules using the GUI 7152. Then the files may be processed by rule engine 7153 as discussed above.

Figure 7:
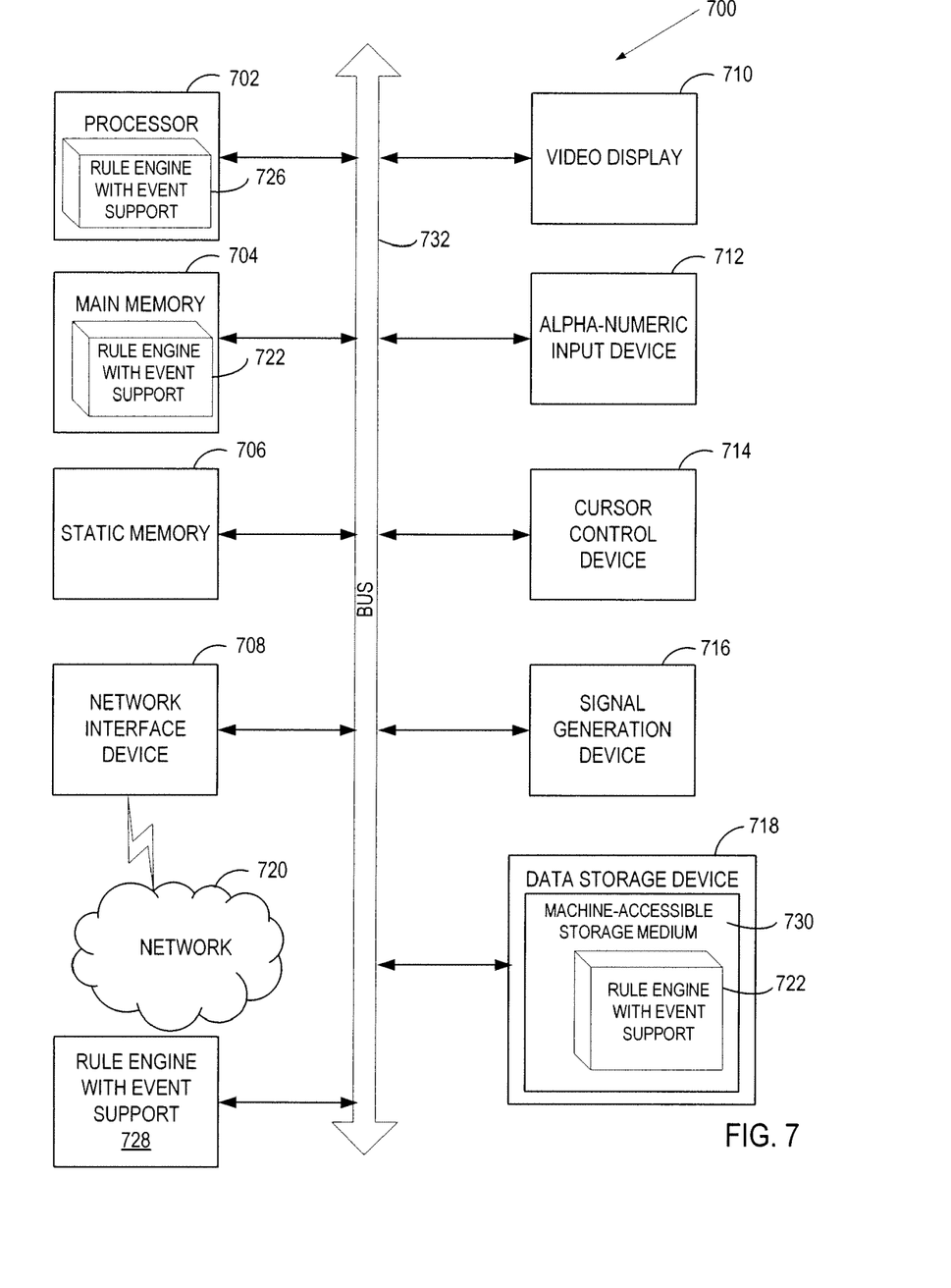
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 732.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute rule engine with event support 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a computer-readable storage medium) on which is stored one or more sets of instructions (e.g., rule engine with event support 722) embodying any one or more of the methodologies or functions described herein. The rule engine with event support 722 may also reside, completely or at least partially, within the main memory 704 and/or within the processing device 702 during execution thereof by the computer system 700, the main memory 704 and the processing device 702 also constituting machine-accessible storage media. The rule engine with event support 722 may further be transmitted or received over a network 720 via the network interface device 708.

While the machine-accessible storage medium 730 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The module, rule engine with event support 728, components and other features described herein (for example, in relation to FIG. 4) can be implemented as discrete hardware components or integrated into the functionalities of hardware components, such as ASICS, FPGAs, DSPs, or similar devices. In addition, the rule engine with event support 728 can be implemented as firmware or functional circuitries within hardware devices. Further, the rule engine with event support 728 can be implemented in any combination of hardware devices and software components.

Thus, some embodiments of a multiple entry point network for stream support in a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   asserting a stream of events into a working memory of a rule engine;
   processing, by the rule engine running on a server, the stream of events against a plurality of rules retrieved from a rule repository of the rule engine;
   creating, by the rule engine running on the server, a network based on the plurality of rules, the network comprising a plurality of root nodes, a plurality of alpha nodes, a plurality of beta nodes, and a plurality of propagation-queuing nodes, wherein one of the plurality of alpha nodes is coupled to one of the plurality of beta nodes via one of the plurality of propagation-queuing nodes if the one of the plurality of alpha nodes and the one of the plurality of beta nodes are coupled to distinct ones of the plurality of root nodes; and
   queuing, by the rule engine running on the server, propagations of the stream of events at the plurality of propagation-queuing nodes.

2. The method of claim 1, wherein each of the stream of events enters the network via one of the plurality of root nodes.

3. The method of claim 1, wherein each of the plurality of root nodes is associated with a subset of one or more of the plurality of alpha nodes, and each of the plurality of alpha nodes is coupled to at least one of the plurality of beta nodes, and wherein subsets of one or more of the plurality of alpha nodes are separate and independent from each other.

4. The method of claim 1, further comprising:
   allowing, by the rule engine running on the server, the plurality of rules to join the stream of events and a plurality of facts coming from different ones of the plurality of root nodes, wherein each of the plurality of root nodes is associated with a subset of one or more of the plurality of alpha nodes, and each of the plurality of alpha nodes is coupled to at least one of the plurality of beta nodes, and wherein each of the stream of events and the plurality of facts asserted in the working memory enters the network via one of the plurality of root nodes.

5. The method of claim 1, wherein the plurality of rules are associated with a business application.

6. An apparatus comprising:
   a working memory to receive a stream of events asserted by a user; and
   a rule engine, coupled to the working memory, to process the stream of events against a plurality of rules retrieved from a rule repository, wherein the rule engine is operable to create a network based on the plurality of rules, the network comprising a plurality of root nodes, a plurality of alpha nodes, a plurality of beta nodes, and a plurality of propagation-queuing nodes, wherein one of the plurality of alpha nodes is coupled to one of the plurality of beta nodes via one of the plurality of propagation-queuing nodes if the one of the plurality of alpha nodes and the one of the plurality of beta nodes are coupled to distinct ones of the plurality of root nodes, and wherein the rule engine is further operable to queue propagations of the stream of events at the plurality of propagation-queuing nodes.

7. The apparatus of claim 6, further comprising:
   a memory to store the rule repository.

8. The apparatus of claim 6, wherein each of the stream of events enters the network via one of the plurality of root nodes.

9. The apparatus of claim 6, wherein each of the plurality of root nodes is associated with a subset of one or more of the plurality of alpha nodes, and each of the plurality of alpha nodes is coupled to at least one of the plurality of beta nodes, and wherein subsets of one or more of the plurality of alpha nodes are separate and independent from each other.

10. The apparatus of claim 6, wherein each of the plurality of root nodes is associated with a subset of one or more of the plurality of alpha nodes, and each of the plurality of alpha nodes is coupled to at least one of the plurality of beta nodes, wherein each of the stream of events and a plurality of facts asserted in the working memory enters the network via one of the plurality of root nodes, and wherein the rule engine further allows the plurality of rules to join the stream of events and the plurality of facts coming from different ones of the plurality of root nodes.

11. The apparatus of claim 6, wherein the plurality of rules are associated with a business application.

12. A system comprising the apparatus of claim 6, further comprising:
   a server on which the rule engine is executed.

13. A non-transitory computer-readable storage medium embodying instructions that, when executed by a processor, will cause the processor to perform a method comprising:
   asserting a stream of events into a working memory of a rule engine;
   causing the rule engine to process the stream of events against a plurality of rules retrieved from a rule repository of the rule engine;
   causing the rule engine to create a network based on the plurality of rules, the network comprising a plurality of root nodes, a plurality of alpha nodes, a plurality of beta nodes, and a plurality of propagation-queuing nodes, wherein one of the plurality of alpha nodes is coupled to one of the plurality of beta nodes via one of the plurality of propagation-queuing nodes if the one of the plurality of alpha nodes and the one of the plurality of beta nodes are coupled to distinct ones of the plurality of root nodes; and
   causing the rule engine to queue propagations of the stream of events at the plurality of propagation-queuing nodes.

14. The non-transitory computer-readable storage medium of claim 13, wherein each of the stream of events enters the network via one of the plurality of root nodes.

15. The non-transitory computer-readable storage medium of claim 13, wherein each of the plurality of root nodes is associated with a subset of one or more of the plurality of alpha nodes, and each of the plurality of alpha nodes is coupled to at least one of the plurality of beta nodes, and wherein subsets of one or more of the plurality of alpha nodes are separate and independent from each other.

16. The non-transitory computer-readable storage medium of claim 13, further comprising:
   causing the rule engine to allow the plurality of rules to join the stream of events and a plurality of facts coming from different ones of the plurality of root nodes, wherein each of the plurality of root nodes is associated with a subset of one or more of the plurality of alpha nodes, and each of the plurality of alpha nodes is coupled to at least one of the plurality of beta nodes, and wherein each of the stream of events and the plurality of facts asserted in the working memory enters the network via one of the plurality of root nodes.

17. The non-transitory computer-readable storage medium of claim 13, wherein the plurality of rules are associated with a business application.

* * * * *